(12) United States Patent
Kim et al.

(10) Patent No.: US 7,130,418 B2
(45) Date of Patent: Oct. 31, 2006

(54) HANDSET FOR COMMUNICATION TERMINAL

(75) Inventors: Chul Jin Kim, Gyeonggi-do (KR); Gi Ho Ha, Gyeonggi-do (KR); Dong Ha Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 10/745,848

(22) Filed: Dec. 23, 2003

(65) Prior Publication Data
US 2004/0136523 A1 Jul. 15, 2004

(30) Foreign Application Priority Data
Dec. 24, 2002 (KR) .............. 10-2002-0083210

(51) Int. Cl.
*H04M 7/00* (2006.01)
(52) U.S. Cl. ............ 379/419; 379/433.01; 379/433.03; 379/428.01
(58) Field of Classification Search ......... 379/433.03, 379/419, 428.01, 433.01; 381/357, 355, 381/356, 361
See application file for complete search history.

(56) References Cited
U.S. PATENT DOCUMENTS
5,442,713 A * 8/1995 Patel et al. ............ 381/357

FOREIGN PATENT DOCUMENTS
CN 1361970 A 7/2002

* cited by examiner

*Primary Examiner*—Jefferey F. Harold
(74) *Attorney, Agent, or Firm*—Lee, Hong, Degerman, Kang & Schmadeka

(57) ABSTRACT

Disclosed is a handset for a communication terminal that minimizes background noise, thereby increasing the clarity of transmitted voice communication. The terminal includes a handset, an acoustic signal path on the handset, a unidirectional condenser microphone within the handset, a microphone holder to secure the microphone within the handset, and a housing to encase the microphone. The microphone is arranged to receive an acoustic signal traveling through the acoustic signal path and within the housing.

15 Claims, 6 Drawing Sheets

HANDSET FOR COMMUNICATION TERMINAL

CROSS REFERENCE TO RELATED APPLICATIONS

Pursuant to 35 U.S.C. § 119(a), this application claims the benefit of earlier filing date and right of priority to the Korean Patent Application No. 2002-83210, filed on Dec. 24, 2002, the content of which is hereby incorporated by reference in its entirety.

BACKGROUND OF THE INVENTION

1. Field of the Invention

The present invention relates to a handset for a communication terminal, and more particularly, to a handset for a communication terminal that minimizes background noise.

2. Description of the Background Art

In general, a handset for a communication terminal includes receiving unit and a transmitting unit. A speaker is usually installed in the receiving unit, where a user receives communication from another party via the communication terminal. The user transmits communication into a microphone installed in the transmitting unit. The speaker converts an electrical signal into voice communication whereas a microphone converts voice communication into an electrical signal. With respect to microphones, conventional handsets generally employ omni-directional condenser microphones, which generate an output that does not compensate or factor in the point of origin of the voice communication with respect to the microphone.

Referring to FIG. 1, a conventional communication terminal with handset is shown. The terminal comprises a body 110 and a handset 120, which is electrically connected to the body 110 by a connection cable 111. The handset 120 comprises a transmitting unit 130 and a receiving unit 140. A microphone is provided in the transmitting unit 130 for converting a user's voice into an electrical signal to be transmitted. Furthermore, a speaker is provided in the receiving unit 140 for converting an electrical signal into voice to be received by the user.

In FIG. 2, the transmitting unit 140 is shown as having a casing 141, which comprises of a front portion 142 and a rear portion 143. The front portion 142 of the casing 141 includes a plurality of acoustic signal paths 144 through which a user's voice travels. A microphone holder 146 is installed within the casing 141, wherein a microphone 150 is fixed in order to receive the user's voice.

The microphone 150 is a conventional type omni-directional condenser microphone. FIG. 3 illustrates a polar graph of the signal output of an omni-directional condenser microphone of a conventional terminal. The circular shape of the output curve in FIG. 3 indicates that position of the user's voice with respect to the microphone 150 is not a factor in determining the signal output. Therefore, the microphone 150 also receives background noise emitted by sources in the user's immediate environment. As a result, a party receiving the user's voice communication also receives this background noise, thereby reducing clarity of the voice communication, especially in noise environments.

SUMMARY OF THE INVENTION

Accordingly, the present invention is directed to a handset for a communication terminal that substantially obviates one or more problems due to limitations and disadvantages of the related art above.

An object of the present invention is to provide a handset for a communication terminal, wherein background noise is minimized.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided communication terminal comprising a handset; at least one acoustic signal path disposed on the handset; a unidirectional condenser microphone installed within the handset and arranged to receive an acoustic signal traveling through the at least one acoustic signal path; a microphone holder installed to fixedly secure the microphone within the handset; and a housing disposed within the handset to encase the microphone.

According to one aspect of the present invention, the at least one acoustic signal path may comprise a plurality of holes perforating a surface of the handset and directed towards the microphone. Furthermore, the at least one acoustic signal path is disposed within a perimeter of the housing and may be approximately, perpendicularly directed towards the microphone. Additionally, the acoustic signal may circumnavigate the microphone holder within the housing.

According to another aspect of the present invention, a handset for a communication terminal is provided, wherein the handset comprises: a front casing coupled to rear casing; a front acoustic signal path disposed on the front casing, wherein a primary acoustic signal travels through the front acoustic signal path; a rear acoustic signal path disposed on the rear casing, wherein a secondary acoustic signal travels through the rear acoustic signal path; a unidirectional condenser microphone installed within the handset and arranged to receive the primary acoustic signal; a microphone holder that fixedly secures the microphone within the handset; and a housing disposed within the handset to encase the microphone.

According to another aspect of the present invention, the microphone is arranged so that reception of the primary acoustic signal is maximized and reception of the secondary acoustic signal is minimized.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

Figure 1:
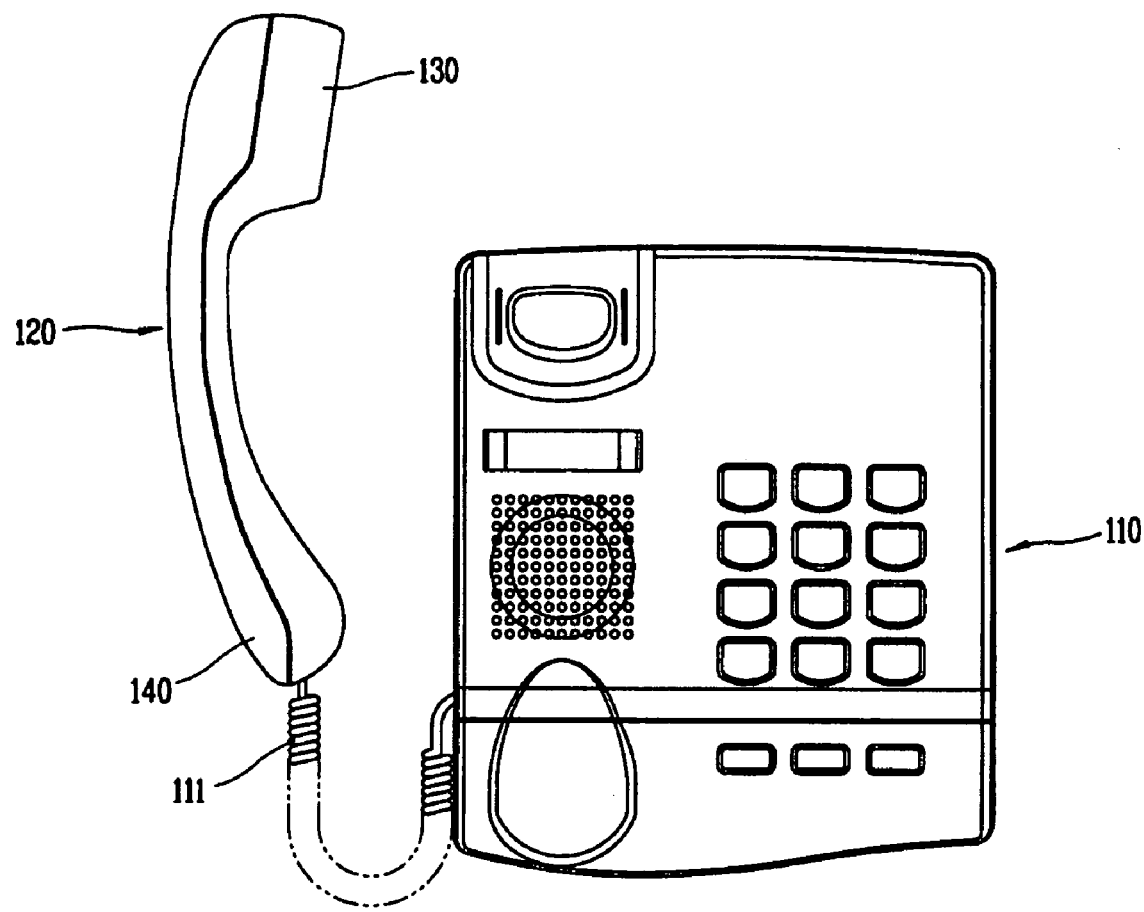
FIG. 1 illustrates a communication terminal with a handset according to the conventional art.
Figure 2:
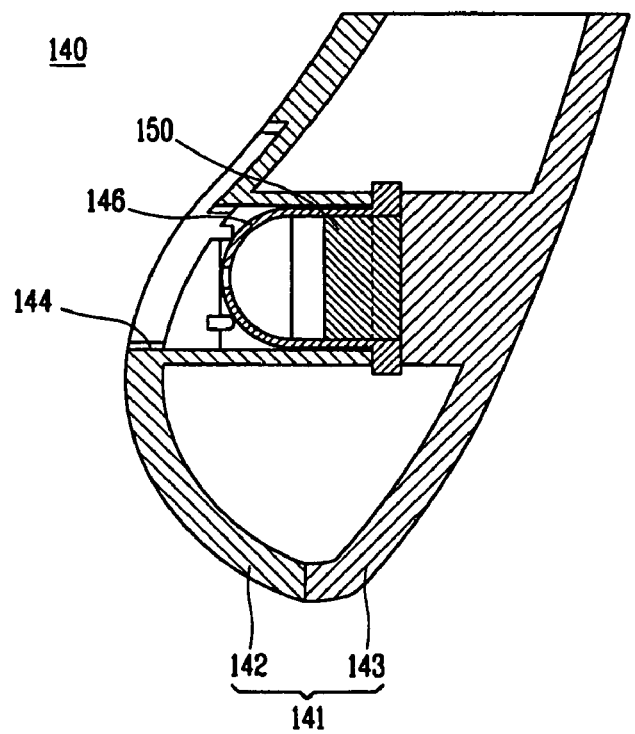
FIG. 2 illustrates a cross-sectional view of a transmitting unit of a handset for a communication terminal according to the conventional art.
Figure 3:
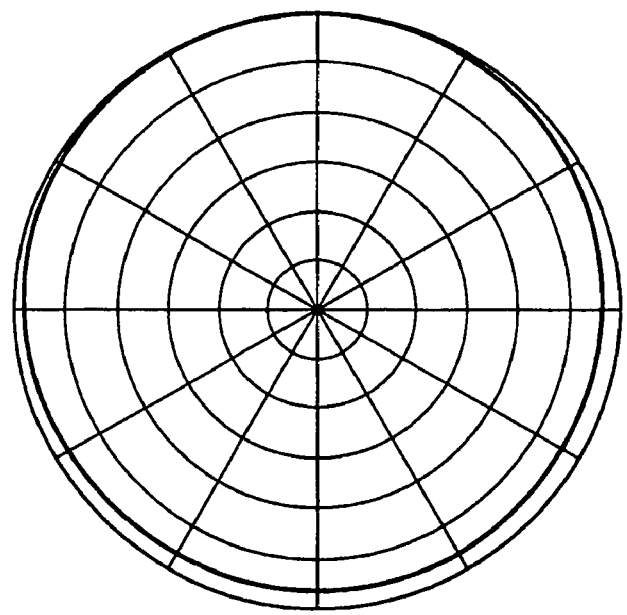
FIG. 3 illustrates a characteristic curve of an omni-directional condenser microphone according to the conventional art.
Figure 4:
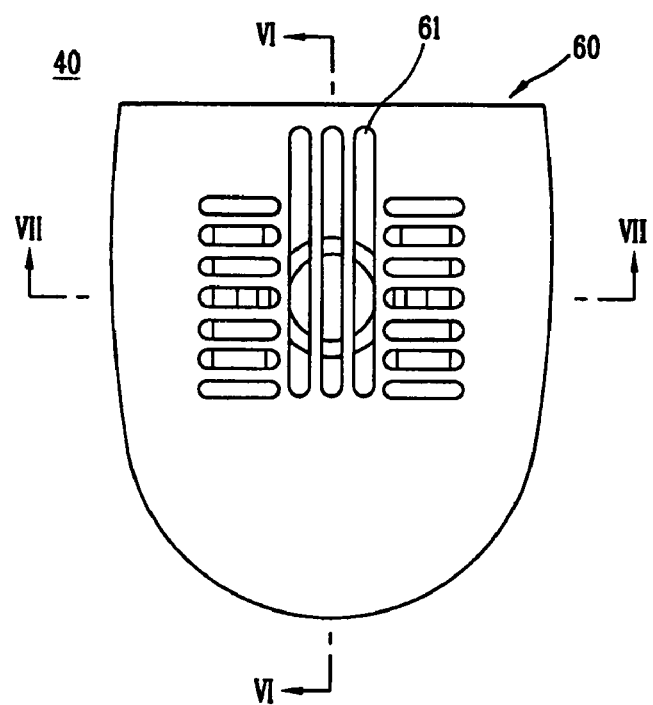
FIG. 4 illustrates a frontal view of a transmitting unit of a handset for a communication terminal according to one embodiment of the present invention.
Figure 5:
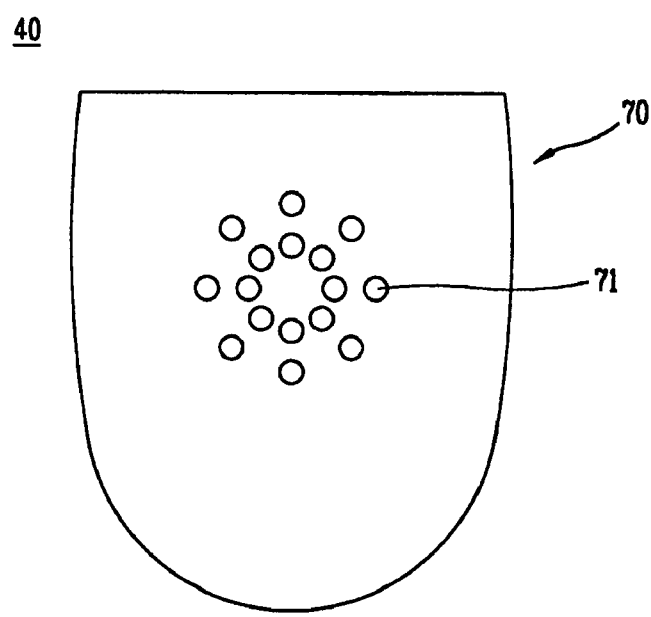
FIG. 5 illustrates a rear view of a transmitting unit of a handset for a communication terminal according to one embodiment of the present invention.

In FIGS. 4 and 5, a transmitting unit 40 of a handset for a communication terminal, in accordance with one embodiment of the present invention, is illustrated. The transmitting unit 40 comprises of a front casing 60 coupled to a rear casing 70. The front casing 60 is provided with a front acoustic signal path 61, through which a user's voice travels. The front acoustic signal path 61 preferably includes slots and perforations of various and alternating shapes and sizes arranged in various patterns, an example of which is shown in FIG. 4. The rear casing 70 is provided with a rear acoustic signal path 71, through which background noise may travel. Similarly, the rear acoustic signal path 71 preferably includes slots and perforations of various and alternating shapes and sizes arranged in various patterns, an example of which is shown in FIG. 5.

Figure 6:
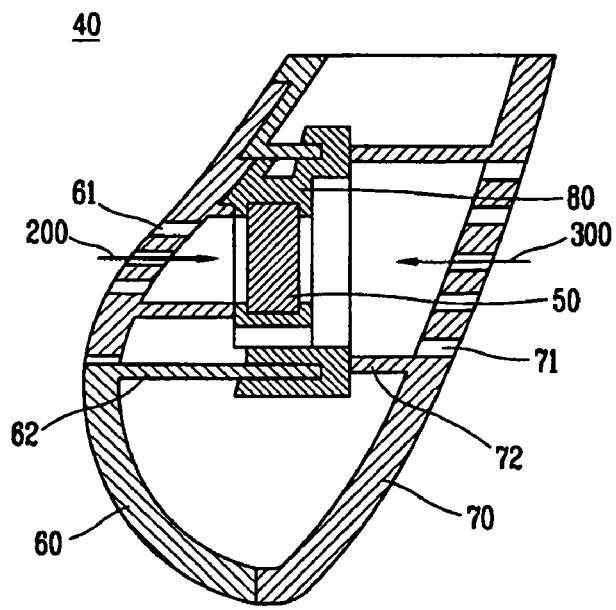
FIG. 6 illustrates a cross-sectional view of a transmitting unit of a handset for a communication terminal, taken along line VI—VI of FIG. 4 and according to one embodiment of the present invention.

Referring to FIG. 6, which is a cross-sectional view of the transmitting unit 40 taken along line VI—VI in FIG. 4, the front acoustic signal 200, which may include a user's voice, for example, passes through the front acoustic signal path 61. Similarly, a rear acoustic signal, which may include background noise, for example, passes through the rear acoustic signal path 71. A unidirectional condenser microphone 50 is installed within the transmitting unit 40. A microphone holder 80 is arranged within the unit 40 to support and fix the microphone 50. Front and rear portions of a shroud or housing 62 and 72 are disposed on the internal surfaces of the front and rear casings 60 and 70, respectively. The front and rear portions 62 and 72 of the housing encase the microphone 50 when the front casing 60 is coupled to the rear casing 70.

Figure 7:
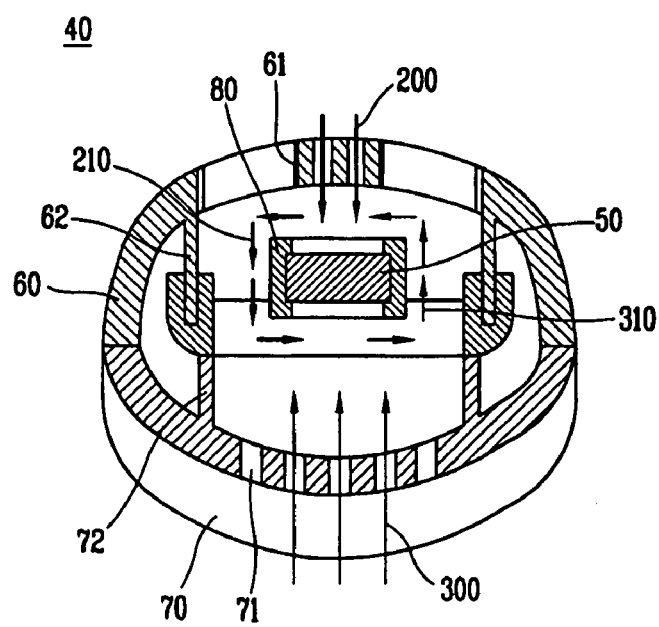
FIG. 7 illustrates a cross-sectional view of a transmitting unit of a handset for a communication terminal, taken along line VII—VII of FIG. 4 and according to one embodiment of the present invention.

In FIG. 7, a cross-sectional view of the transmitting unit 40 taken along line VII—VII in FIG. 4 is shown. As the front acoustic signal 200 enters and travels through the front acoustic signal path 61, a portion 210 of the front acoustic signal 200 is separated and not received by the microphone 50. Similarly, as the rear acoustic signal 300 enters and travels through the rear acoustic signal path 71, a portion 310 of the rear acoustic signal 300 is separated and not received by the microphone 50. The microphone holder 80 comprises of a structure wherein the front side of the holder 80 communicates with a rear side of the holder 80 so that an acoustic signal may circulate around the holder 80.

By adjusting the directional angle of the voice-receiving portion of the microphone 50 with respect to the front casing 60 in order to maximize reception of a user's voice, the content of unwanted background noise in the acoustic signal 200 is minimized. Because the velocity of background noise is not generally linear with that of a user's voice, the angle of incidence of the background noise with respect to the receiving portion of the microphone 50 is less than the angle of incidence of the user's voice. Accordingly, the unidirectional condenser microphone 50 does not receive the portion 210 due to its angle of incidence. Furthermore, the microphone 50 can also be arranged within the transmitting unit 40 to minimize reception of the rear acoustic signal 300, thereby increasing the relative size of the portion 310 with respect to the rear acoustic signal 300. As a result, the amount of background noise within the acoustic signal 300 that is not received by the microphone 50 is increased.

Figure 8:
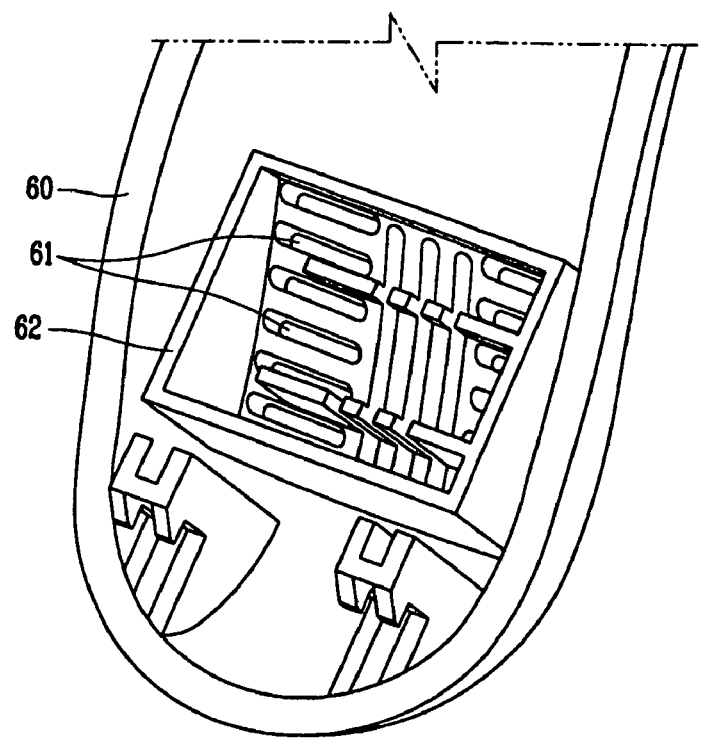
FIG. 8 illustrates a perspective view of an internal surface of a front casing for a handset for a communication terminal according to one embodiment of the present invention.
Figure 9:
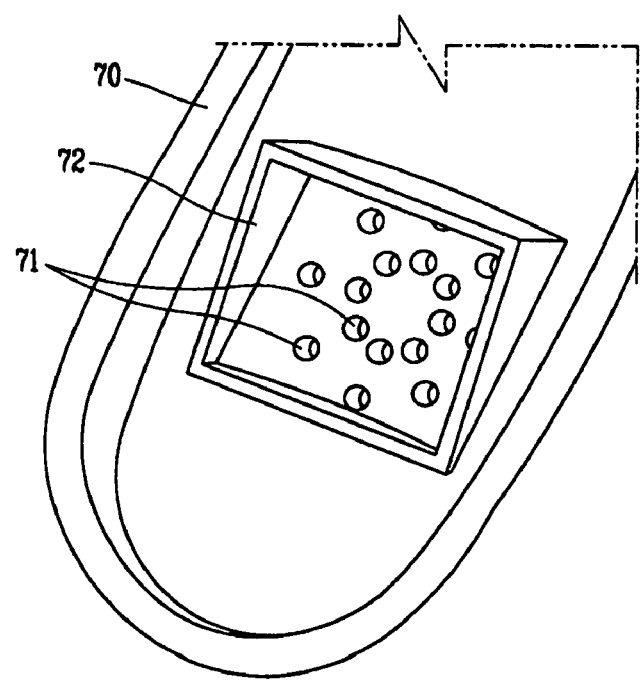
FIG. 9 illustrates a perspective view of an internal surface of a rear casing for a handset for a communication terminal according to one embodiment of the present invention.

Referring to FIGS. 8 and 9, the front and rear portions 62 and 72 of the housing or shroud are exemplified as rectangular in shape. However, the portions 62 and 72 may be formed in various shapes including cylindrical and asymmetric shapes. The housing portions 62 and 72 extend from the internal surface of the front and rear casings 60 and 70, respectively. When the front and rear casings 60 and 70 are coupled, so to are the housing portions 62 and 72. As a result, the microphone 50 is encased within the housing, thereby confining the acoustic signals 200, 210, 300, and 310.

Figure 10:
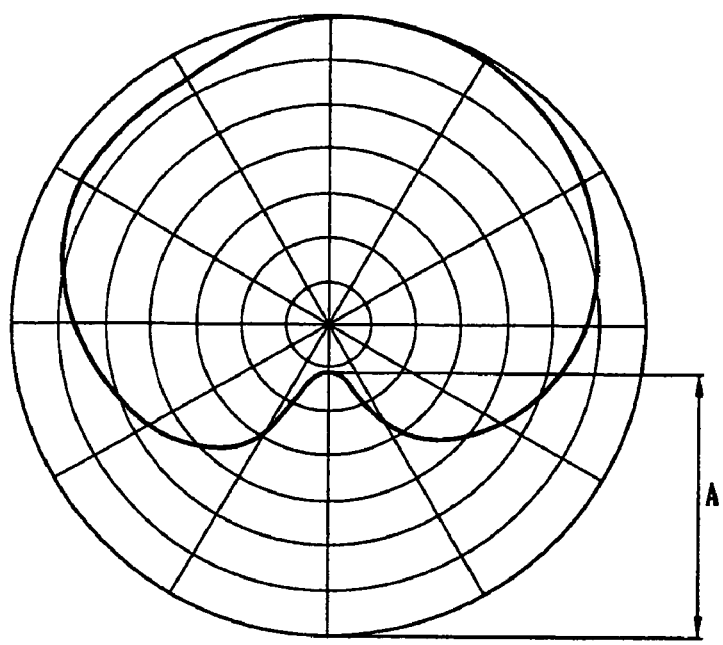
FIG. 10 illustrates a characteristic curve of a unidirectional condenser microphone according to one embodiment of the present invention.

In FIG. 10, a unidirectional condenser microphone, according to one embodiment of the present invention, is shown. The cardioid pattern is generated from outputs according to varying angles of incidence between the sound source and a unidirectional condenser microphone. The value indicated by "A" correlates to the amount of noise cancelled by the unidirectional feature of the microphone. Consequently, the greater the value of "A" corresponds to a greater amount of noise cancellation.

Figure 11:
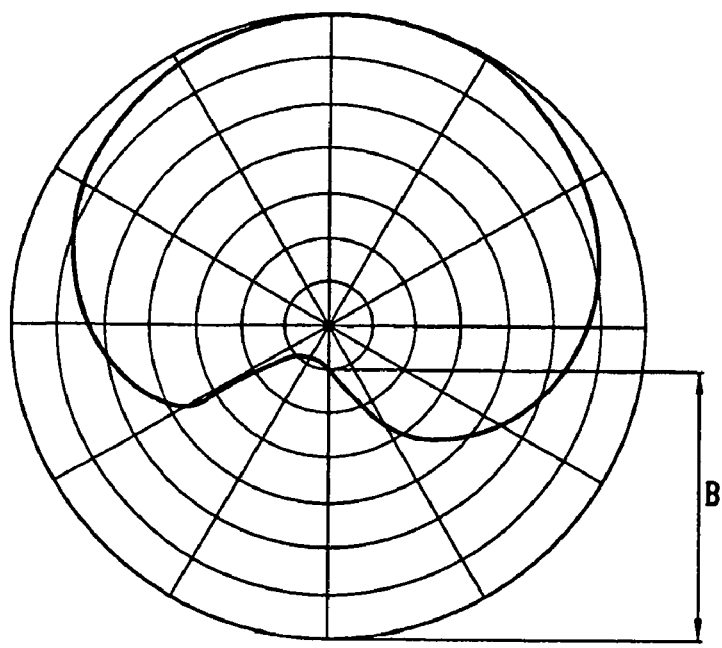
FIG. 11 illustrates a characteristic curve of a transmitting unit of a handset for a communication terminal according to one embodiment of the present invention.

In FIG. 11, a characteristic curve of a transmitting unit of a handset for a communication terminal according to one embodiment of the present invention is shown. The cardioid pattern in the graph of FIG. 11 indicates noise cancellation as a result of employing a unidirectional condenser microphone. The pattern of FIG. 11 is similar to that of FIG. 10, as described above. Furthermore, Table 1 (below) illustrates a comparison of between the output characteristics of a unidirectional condenser microphone and of a transmitting unit according to one embodiment of the present invention.

TABLE 1

|  | Angle (deg) | | | | | | | | | | | |
| --- | --- | --- | --- | --- | --- | --- | --- | --- | --- | --- | --- | --- |
|  | 0 | 30 | 60 | 90 | 120 | 150 | 180 | 210 | 240 | 270 | 300 | 330 |
| Unidirectional Condenser Microphone | 48.8 | 49.3 | 51.4 | 55.4 | 61.7 | 71.4 | 78.6 | 69.6 | 61.3 | 55.7 | 52.1 | 52.1 |
| Transmitting Unit | 46.8 | 47.4 | 49.6 | 53.7 | 59.4 | 68.9 | 76.6 | 77.1 | 63.5 | 55.5 | 50.7 | 47.9 |

The values shown in Table 1 and FIG. 11, and especially by the value "B," indicate that the transmitting unit 40 does not significantly vary from the unidirectional condenser microphone with respect to noise-canceling effects.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of wired communication terminals. In alternative embodiments, mobile communication terminals can be substituted for the present invention.

What is claimed is:

1. A communication terminal comprising:
   a handset;
   a unidirectional condenser microphone installed within the handset and arranged to receive an acoustic signal traveling through at least one acoustic signal path;
   a microphone holder installed to fixedly secure the microphone within the handset; and
   a housing disposed within the handset to encase the microphones,
   wherein the housing comprises housing portions that extend from front and rear casings of the handset such that the housing portions contact each other, and
   wherein each of the housing portions comprises an acoustic signal path of the at least one acoustic signal path.

2. The terminal of claim 1, wherein the at least one acoustic signal path comprises a plurality of holes perforating a surface of the handset and directed towards the microphone.

3. The terminal of claim 2, wherein the at least one acoustic signal path is disposed within a perimeter of a shroud.

4. The terminal of claim 2, wherein the at least one acoustic signal path is approximately, perpendicularly directed towards the microphone.

5. The terminal of claim 1, wherein the acoustic signal circumnavigates the microphone holder within the housing.

6. A handset for a communication terminal, the handset comprising:
   a front casing coupled to rear casing;
   a front acoustic signal path disposed in a front housing portion on the front casing,
   wherein a primary acoustic signal travels through the front acoustic signal path;
   a rear acoustic signal path disposed in a rear housing portion on the rear casing, wherein a secondary acoustic signal travels through the rear acoustic signal path;
   a unidirectional condenser microphone installed within the handset and arranged to receive the primary acoustic signal;
   a microphone holder that fixedly secures the microphone within the handset; and
   a housing, comprising the front housing portion and the rear housing portion such that the front housing portion and the rear housing portion contact each other, disposed within the handset to encase the microphone.

7. The handset of claim 6, wherein the front and rear acoustic signal paths each comprise a plurality of holes perforating the front and rear casings, respectively.

8. The handset of claim 7, wherein the front and rear acoustic signal paths are formed within a perimeter of the housing.

9. The handset of claim 7, wherein the front and rear acoustic signal paths are approximately, perpendicularly directed towards the microphone.

10. The handset of claim 6, wherein the housing comprises:
    a front portion affixed to an inner surface of the front casing; and
    a rear portion affixed to an inner surface of the rear casing, wherein the front portion corresponds to and couples with the rear portion to encase the microphone when the front and rear casings are coupled.

11. The handset of claim 10, wherein the front and rear acoustic signal paths are formed within perimeters of the front and rear portions of the housing, respectively.

12. The handset of claim 10, wherein the primary and secondary acoustic signals circumnavigate the microphone holder within the housing.

13. The handset of claim 6, wherein the housing is rectangular in shape.

14. The handset of claim 6, wherein the housing is ovoid in shape.

15. The handset of claim 6, wherein the microphone is arranged so that reception of the primary acoustic signal is maximized and reception of the secondary acoustic signal is minimized.

* * * * *